United States Patent [19]
Ambler et al.

[11] 4,053,828
[45] Oct. 11, 1977

[54] METAL DETECTOR WITH FIRST AND SECOND NESTED RECTANGULAR COILS

[75] Inventors: Frank E. Ambler, Sepulveda; Carl James Duthler, Westhills; Norton L. Moise, Pacific Palisades, all of Calif.

[73] Assignee: Xonics, Inc., Van Nuys, Calif.

[21] Appl. No.: 682,514

[22] Filed: May 3, 1976

[51] Int. Cl.² ............................................. G01R 33/12
[52] U.S. Cl. ............................ 324/41; 29/602 R; 336/87; 336/122; 336/188
[58] Field of Search .................. 324/34 R, 41, 3, 6, 324/67; 336/87, 122, 188, 205; 334/61, 62; 29/602 R

[56] References Cited
U.S. PATENT DOCUMENTS

| | | | |
|---|---|---|---|
| 1,624,473 | 4/1927 | Clement | 336/87 |
| 1,676,779 | 7/1928 | Herr | 324/6 |
| 2,160,356 | 5/1939 | Fore et al. | 324/41 |
| 2,912,642 | 11/1959 | Dahle | 324/34 R |
| 3,457,502 | 7/1969 | Cohn | 324/41 |

FOREIGN PATENT DOCUMENTS

| | | | |
|---|---|---|---|
| 1,299,183 | 12/1972 | United Kingdom | 324/3 |

*Primary Examiner*—Robert J. Corcoran
*Attorney, Agent, or Firm*—Harris, Kern, Wallen & Tinsley

[57] ABSTRACT

An orthogonal coil metal detector with nesting rectangular coils, each comprising a plurality of turns encapsulated in an insulating material and having a layer of electrical resistive material thereon. An encapsulating material in the gap between the coils bonding the coils together. A fixture for supporting the coils in spaced relations and providing for translation and rotation of one coil relative to the other for adjusting the coil position to a minimum coupling condition, and for holding the coils in the adjusted condition during curing.

19 Claims, 6 Drawing Figures

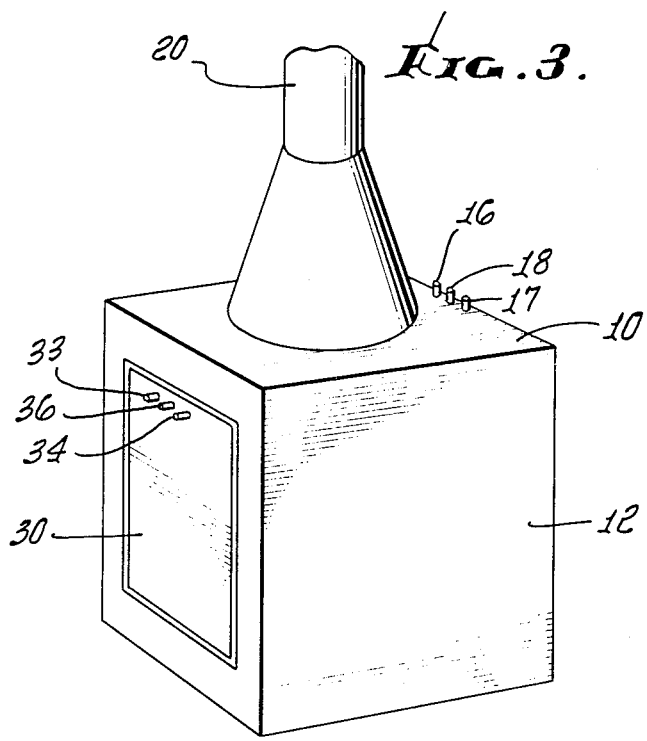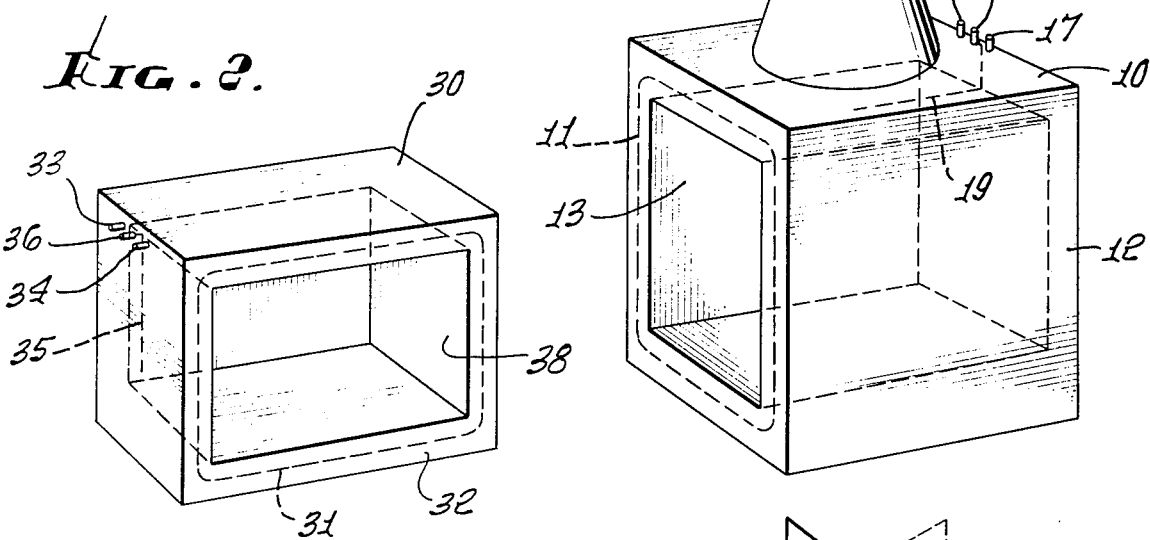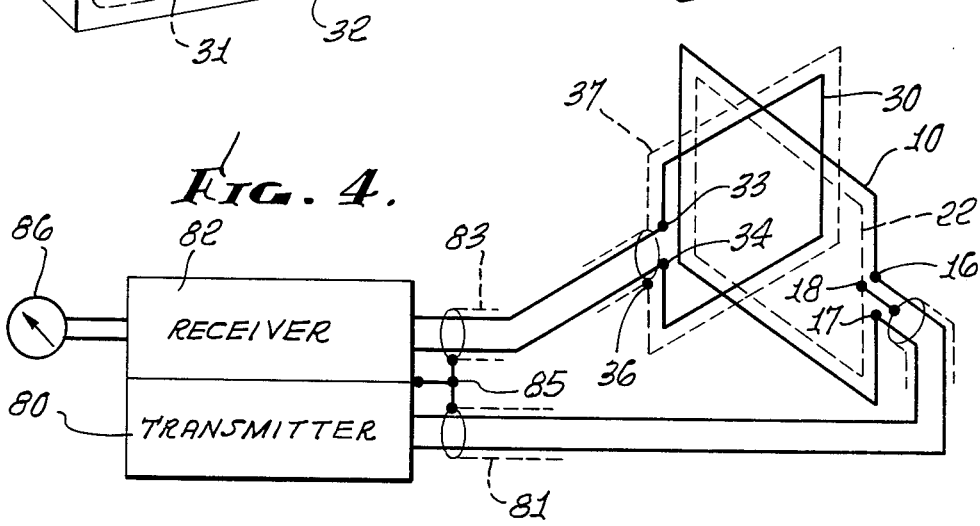

METAL DETECTOR WITH FIRST AND SECOND NESTED RECTANGULAR COILS

BACKGROUND OF THE INVENTION

This invention relates to metal detectors using orthogonal coils and in particular, to a new and improved coil configurtion, coil assembly fixture, and method of making same.

In one conventional form of metal detector, first and second coils are mounted with their axes at right angles to each other so as to minimize the coupling between them. In another conventional form the coils are coplanar. The present invention is directed to the right angle or orthogonal configuration.

In the orthogonal type detector, an a-c voltage is applied to one coil and the signal produced at the other coil is amplified and electronically processed to drive a signal indicator. When the unit is moved into an environment containing a metallic object, the object perturbs the magnetic field produced by the source coil and a desirable signal is coupled into the detector coil. For a magnetic type object, the magnetic field is distorted by providing a low reluctance path. For a non-magnetic, metallic object, the source magnetic field produces surface eddy currents in the object, which in turn create a flux field that alters the source flux field. Ideally, there should be zero transfer of energy or zero coupling between the coils where no metallic objects are present. The introduction of a metallic object into the field of the unit then produces an increase in output of the second or detector coil and an indication at the indicator unit. The degree and stability to which the coils can be de-coupled in the non-metallic environment influences the range of the unit and the complexity of the detector electronics.

While the invention is described and discussed herein as a metal detector, it will be realized that the device is equally suited for detection of any object which disturbs the magnetic field. This includes magnetic non-metallic materials and magnetic non-conducting materials, such as ferrites, and conducting non-magnetic materials and conducting non-metallic materials, such as carbon and some liquids. While the principal use presently intended for the invention is the detection of metal objects, it is not so limited.

While zero coupling between coils is desired, it is not possible to obtain this in actual practice. The physical size and shape of the coils, the variations occurring during coil manufacture, and the opposing effects of magnetic and capacitive coupling result in residual coupling between the coils when actual equipment is built. In addition, changes in environmental conditions, particularly temperature, cause some change in the residual coupling even if it can be made very low initially. Various attempts have been made in the past to achieve a minimum coupling, and many of these utilize a third coil with some form of external adjustment. U.S. Pat. No. 3,457,502 and the references of record therein are typical of the prior art devices.

It is an object of the present invention to provide a new and improved metal detector using two prefabricated coils which are assembled together to produce the finished unit while providing very low intercoil coupling. A further object is to provide such a detector which does not require external resistance, capacitance or inductance adjustment to obtain the null or minimum coupling condition. Other objects are to provide a fixture for assembly of the detector and to provide a method for producing the detector.

SUMMARY OF THE INVENTION

When two coils are positioned with respect to each other such that the energy coupled from the primary coil to the detector coil is a minimum, two types of inter-coil coupling have been balanced against each other. The first type of coupling is the magnetic coupling through flux linkage, which is controlled by mechanical alignment of the coils. The second coupling is capacitive coupling due to the close proximity of the coils.

If capacitive coupling was not present, the coils could be adjusted for near perfect symmetry and minimum coupling. This desirable characteristic of little or no capacitive coupling may be approached by inserting an electrical conducting shield between the coils. The typical grounded shield essentially eliminates the capacitively coupled signal by shorting it out before it reaches the detector coil. But such a shield produces eddy current coupling, which can be larger than the capacitive coupling without the shield.

The present invention provides a shield construction between the coils which permits balancing the two unwanted coupling signals resulting from the two types of coupling, to a practical minimum total value. The shield construction permits prefabrication of the individual coils and does not require a third coil or any external electrical adjustments.

Two rectangular encapsulated coils, one nesting inside the other, are provided with a layer of electrical resistive material. The coils are nested with an air gap between them and are then translated and rotated relative to each other with the primary coil excited from a transmitter and with a detector connected to the secondary or detector coil, to obtain a minimum or null at the detector output. The gap between the coils is then filled with an encapsulating material which is cured to bond the coils together in the desired configuration.

The invention includes a fixture for supporting and manipulating the coils during the adjustment and bonding steps, and a method for producing the metal detector with the orthogonal coils.

BRIEF DESCRIPTION OF THE DRAWINGS

FIG. 1 is a perspective view of an outer coil incorporating the presently preferred embodiment of the invention;

FIG. 2 is a view similar to that of FIG. 1 showing the inner coil;

FIG. 3 is a view similar to that of FIGS. 1 and 2, showing the two coils assembled;

FIG. 4 is an electrical diagram of the metal detector of FIGS. 1-3;

DESCRIPTION OF THE PREFERRED EMBODIMENT

Figure 5:
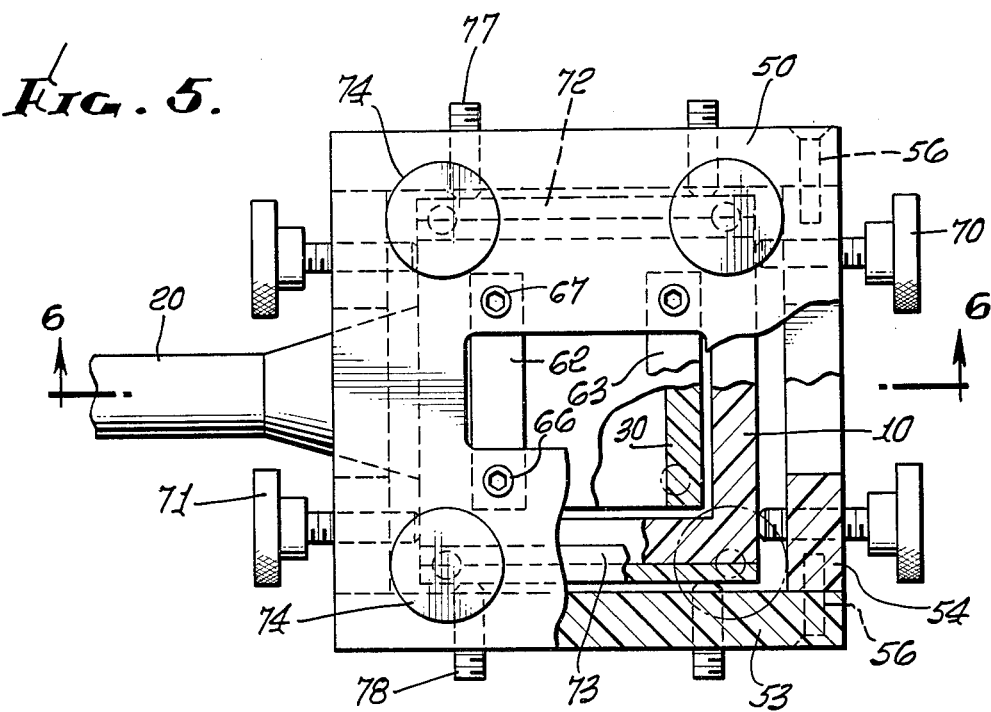
FIG. 5 is a top view of a coil assembly fixture with the unit of FIG. 3 mounted therein.

The outer coil 10 is illustrated in FIG. 1 and includes a plurality of turns of wire 11 encapsulated in an insulating material 12 to provide a rigid coil of rectangular configuration, with an opening 13 therethrough. The coil may be manufactured in the conventional manner, typically by winding on a mandrel which when removed provides the opening 13. The insulating material typically is an epoxy resin, and many types are presently available.

The ends of the coil 10 are connected at terminals 16, 17. Another terminal 18 is connected by means of a conducting wire 19, which is laid along the inner surface of the coil, to a layer of electrical resistive material which is applied to the coil 10, at least on the inner surface and preferably all over. This layer functions as a partial shield and is indicated by the dashed line 22 in the electrical diagram of FIG. 4.

A support shaft 20, typically formed of an insulating material such as fiberglass impregnated with the epoxy resin used for the coil, may be attached to the coil during the encapsulation operation. The shaft 20 may be tubular, providing a passage for the electrical cables interconnecting the coils with the transmitter and receiver.

The inner coil 30 is made in the same manner, comprising a plurality of turns of wire 31 encapsulated in an insulating material 32. The ends of the coil are connected to terminals 33 and 34. A conducting wire 35 on the outer surface of the coil 30 connects terminals 36 to a layer of electrical resistive material which is applied to the coil, at least on the outer surface and preferably all over, indicated as the partial shield 37 in FIG. 4.

The coils 10 and 30 are dimensioned so that the coil 30 can be positioned within the coil 10 with a small gap therebetween, typically in the order of a few tenths of an inch. The opposing ends of the opening 38 in the coil 30 may be plugged or closed so that encapsulating material used in bonding the coils together does not have to fill this cavity.

Figure 6:
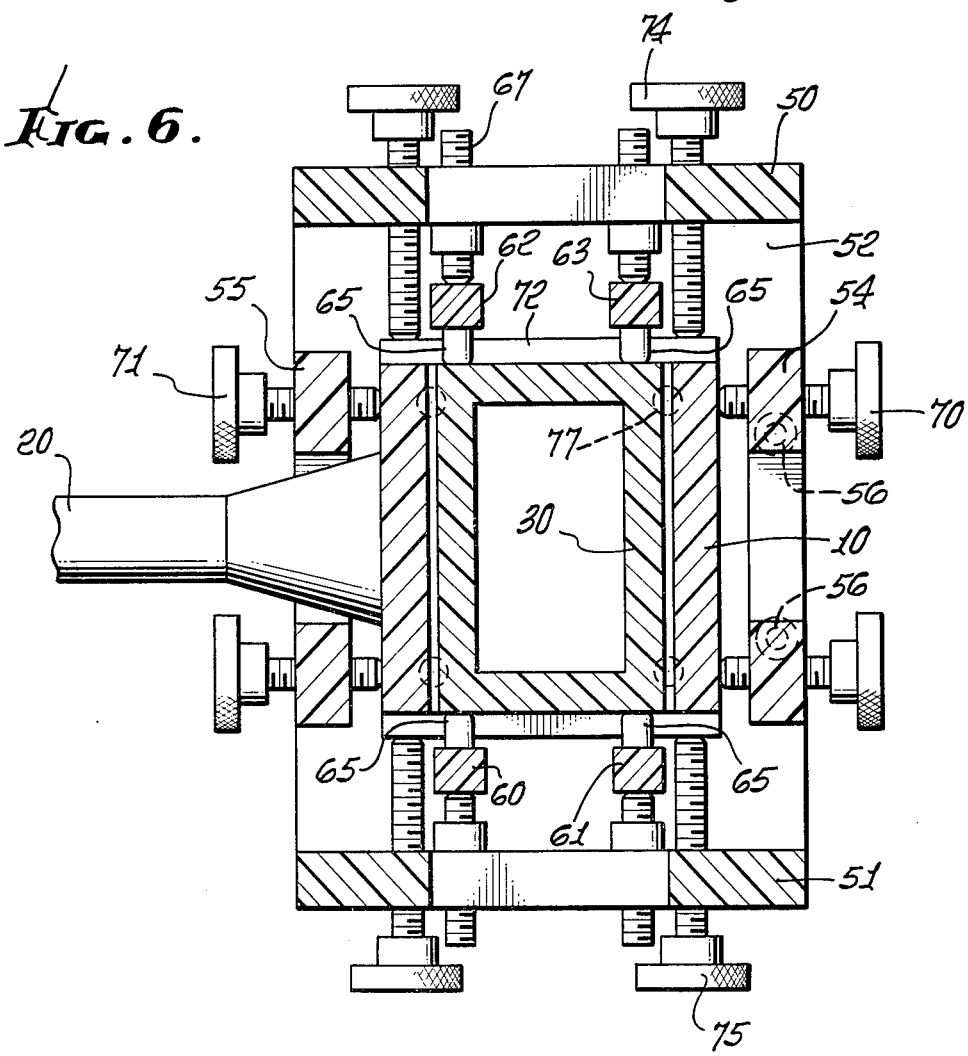
FIG. 6 is a sectional view taken along the line 6—6 of FIG. 5.

The coil 30 is supported within and spaced from the coil 10 while the relationship between the two coils is being adjusted and while the coils are being potted or bonded in this adjusted position. A preferred embodiment for a fixture for accomplishing this is shown in FIGS. 5 and 6. The fixture includes a frame with top 50, bottom 51, sides 52, 53, and ends 54, 55. The frame is held together by screws such as those indicated at 56. The coils are inserted into and removed from the frame by removing one of the ends of the frame.

The coil 30 is supported between lower yokes 60, 61 and upper yokes 62, 63. Each of the yokes comprises a horizontal bar with two projecting pins 65 which bear against the coil adjacent corners thereof. Pressure is transmitted to each yoke by a set of spaced screws, such as the screws 66, 67 which engage the yoke 62. Four of these screws are in the top 50 and four are in the bottom 51.

The outer coil 10 is supported between six sets of screws, with one set at each face of the frame with each screw engaging the coil directly or indirectly adjacent a corner. The screws 70 are in the end 54 and screws 71 are in end 55. If desired, the coil 10 may be carried in opposing channel members 72, 73, with screws 74 in the top 50 engaging the upper flanges of the channels and with screws 75 in the bottom 51 engaging the lower flanges. Screws 77 in the side 52 engage the channel 72 adjacent the flanges thereof, and screws 78 in the side 53 engage the channel 73 adjacent the flanges. The opposing channel members for the outer coil allow more even pressure to be applied to the coil during adjustments.

The outer coil 10 can be translated along three axes and can be rotated about all three axes relative to the coil 30 by adjustment of the screws which engage the outer coil.

When the coils are mounted in the frame as shown in FIGS. 5 and 6, the coil 10 is connected to a transmitter 80 by a shielded cable 81, and the coil 30 is connected to a receiver 82 by another shielded cable 83, as shown in FIG. 4. The terminal 18 of the coil 10 is connected to the shield of the cable 81, and the terminal 36 of the coil 30 is connected to the shield of the cable 83. The two shields are connected to the common circuit ground of the transmitter and receiver at point 85 adjacent the transmitter and receiver. This common ground is also connected to the electronics case at this point.

The transmitter 80 provides an a-c signal to the coil 10, with the signal produced at the coil 30 due to coupling with the coil 10 being detected at the receiver and indicated on a meter or other output device 86. With the resistive layers 22, 37 connected only at the remote point 85, a change in position of one coil with respect to the other changes the direct magnetic, the capacitive and the eddy current coupling between the coils. The position of the outer coil with respect to the inner coil is varied by manipulating the screws of the fixture to obtain a minimum or null indication.

The nulling test fixture must contain no metallic parts. Fiberglass materials with temperature coefficients near those of the coil's epoxy material provide the best solution to maintaining the null as the epoxy is heat cured. The fixture is mounted in a non-metallic oven which has hot air supplied through a closed-loop duct system. It is essential that the nulling environment be free of metallic material. The electronics is located at the outer end of the handle 20, a point which is a coupling sensitivity null for the two rectangular coils.

When the coils are ready to be bonded into a single unit, the oven housing the fixture is heated to the epoxy cure temperature. Then an encapsulating material, typically the same material that was used in encapsulating the coils, is introduced into the gap between the coils, as by utilizing a syringe and needle. The fixture with the coils in place can then be finely adjusted during the first few minutes of the cure cycle. After curing, the coil assembly having the appearance of FIG. 3 is removed from the fixture and is ready for use. The coil assembly is used as a metal detector with a transmitter and receiver as shown in FIG. 4. When a metal object is introduced into the field produced by the coil 10, additional energy is coupled to the coil 30, providing an indication at the meter 86.

In making the coils, it is preferred to have the wire and the insulating material of materials having thermal expansion coefficients which closely match each other. Also, it is preferred to have the fixture built of a material having a thermal expansion coefficient which closely matches that of the coil. This reduces the relative movement of the various components and is especially significant when the encapsulating materials require a high temperature cure. The coils preferably are wound with aluminum wire which has a thermal expansion coefficient which can be closely matched by an epoxy resin. The terminals for attachment of leads to the coils and positioned so that they appear in a sensitivity null position between the coils, thereby having minimum electrical coupling. The wires 19, 35 which connect the electrical resistive layers to the corresponding terminals should be located along a sensitivity null between the two coils. The wires preferably are of a length to extend along one face of the coil to provide sufficient area for good electrical contacts, but should not form a loop. The material used for the electrical resistive layers should have a thermal expansion coefficient closely approximating that of the insulating material and wire used in the coils. This may be accomplished by utilizing carbon particles mixed in the same insulating material as was used for making the coil, with this liquid being painted or sprayed onto the coil.

The resistivity of the material used for forming the layers is changed by changing the amount of carbon. The shielding material may be applied in a series of layers, with the degree of coupling between the coils being measured after each layer is applied. The optimum de-coupling is a compromise between good electrical shielding obtained by a low resistance layer and low eddy current coupling obtained by a high resistance layer. The optimum resistivity for any specific coil configuration may be ascertained empirically by using a plurality of layers and checking in the fixture for the best obtainable null after each layer is applied. It has been determined that the optimum operation is achieved when the layers have a resistivity in the range of about 1,000 to about 100,000 ohms per square unit of area, depending upon spacing or capacitance, between coils, and the areas of the coils to which the material has been applied. The preferred value is about 10,000 ohms per square unit of area.

Laboratory tests on assembled coils using an optimized resistive shielding material have produced null improvements of better than 10 to 1 over previously employed conductive shields using scribed lines to break up the shield eddy current paths. Of prime importance in the use of the equipment is the null stability with temperature, since a fast rate of change of the null voltage may be confused with a weak target. Consequently, stability is a limit on the detectable range. Drift rates of less than 1/5 those previously recorded have been obtained using the construction, nulling techniques, and shielding of the present invention.

It is known that eddy currents in shields can be reduced by providing discontinuities in the eddy current path. This may be accomplished by applying the shield in strips. However where the shield material is relatively thin and soft, as is the resistive layer of the present invention, the layer may be cut by scribing lines perpendicular to the direction of the eddy current. The scribing technique may be used with the present invention if desired. The magnitude of the eddy currents and the cost of manufacture are a function of the spacing between scribed lines, i.e., the number of lines. Hence the resistive layer of the present invention is preferred to scribed lines on a conductive shield, but both the resistive layer and scribed lines therein may be used where desired.

We claim:

1. In a two coil metal detector, the combination of:
   a first coil of rectangular configuration and comprising a plurality of turns of wire encapsulated in an insulating material and having a rectangular opening;
   a second coil of rectangular configuration and comprising a plurality of turns of wire encapsulated in an insulating material, with said second coil positioned in said first coil opening with the axes of said coils disposed substantially at a right angle;
   a first layer of electrical resistive material on said first coil;
   a second layer of electrical resistive material on said second coil, each of said layers of electrical resistive material having a resistance in the range of about 1,000 to about 100,000 ohms per square unit of area;
   means for making electrical connections to said coils and layers; and
   an encapsulating material in the gap between said coils binding said coils together in a fixed relation, with said coils adjusted relative to each other for substantially minimum coupling between the coils.

2. A metal detector as defined in claim 1 wherein said layers of electrical resistive material have a resistance of about 10,000 ohms per square unit of area.

3. A metal detector as defined in claim 1 wherein said means for making connections includes:
   a first two conductor cable with shield, with the two conductors connected to said first coil and the shield connected to said first layer; and
   a second two conductor cable with shield, with the two conductors connected to said second coil and the shield connected to said second layer, with said shields connected together only at a point remote from said coil.

4. A metal detector as defined in claim 3 wherein said means for making connections includes a first conductor on the inner surface of said first coil with said first layer thereover connecting said first layer to said shield of said first cable, and a second conductor on the outer surface of said second coil with said second layer thereover connecting said second layer to said shield of said second cable.

5. A metal detector as defined in claim 1 wherein said first and second layers comprise encapsulating material with electrical conducting particles therein.

6. A metal detector as defined in claim 1 wherein said first layer is applied all over said first coil and said second layer is applied all over said second coil.

7. In a metal detector, the combination of:
   a first coil of rectangular configuration and comprising a plurality of turns of wire encapsulated in an insulating material and having a rectangular opening;
   a first layer of electrical resistive material on said first coil;
   first means for making electrical connections to said first coil and layer;
   a second coil of rectangular configuration and comprising a plurality of turns of wire encapsulated in an insulating material;
   a second layer of electrical resistive material on said second coil;
   second means for making electrical connections to said second coil and layer;
   a frame having top, bottom, two side and two end faces, with a set of screw means carried in each of said faces, with the inner ends of said screw means engaging said first coil in supporting relation; and
   coil support means mounted in opposing faces of said frame in engagement with said second coil for supporting said second coil in said opening of said first coil, whereby said coils may be translated and rotated relative to each other to achieve substantially minimum coupling between the coils.

8. A metal detector as defined in claim 7 wherein said coil support means includes two additional sets of screw means carried in said opposing faces, with the inner ends thereof engaging said second coil in supporting relation.

9. A metal detector as defined in claim 8 wherein said first coil screw means includes first and second channels positioned on opposite sides of said first coil, and screws in said frame bearing against said channels.

10. A metal detector as defined in claim 7 wherein said first means for making connections includes a first two conductor cable with shield, with the two conductors connected to said first coil and the shield connected to said first layer, and said second means for making connections includes a second two conductor cable with shield, with the two conductors connected to said second coil and the shield connected to said second layer, with said shields connected together only at a point remote from said coils and frame.

11. A metal detector as defined in claim 10 including a transmitter connected to one of said cables and a receiver and null indicator connected to the other of said cables, with the transmitter and receiver circuit ground connected to said shield at said point.

12. In a nulling fixture for a two coil metal detector, the combination of:

a frame having top, bottom, two side and two end faces, with a set of screw means carried in each of said faces, with the inner ends of said screw means adapted for engaging a first coil for supporting the coil within the frame; and a second coil support means mounted in opposing faces of said frame for engaging and supporting a second coil positioned within the first coil, providing for translating and rotating one of the coils relative to the other.

13. A metal detector fixture as defined in claim 12 wherein a set of screw means includes four screws carried in the frame face for applying forces to the coil adjacent four corners thereof.

14. A metal detector fixture as defined in claim 12 wherein said screw means includes first and second channels for positioning on opposite sides of a coil, and screws in said frame bearing against said channels adjacent four corners thereof.

15. A metal detector fixture as defined in claim 14 wherein said coil support means includes two additional sets of screw means carried in said opposite faces with the inner ends thereof adapted for engaging and supporting the second coil within the first coil.

16. A method of manufacturing an orthogonal coil metal detector, including the steps of:

applying an electrical resistive layer to a first rectangular encapsulated coil;

applying an electrical resistive layer to a second rectangular encapsulated coil;

positioning the second coil within the first coil with an air gap therebetween;

connecting the layers together at a point remote from the coils;

connecting an a-c source to one of the coils and detecting the a-c signal produced in the other coil;

rotating and translating the coils relative to each other to obtain a minimum signal from said other coil;

filling the gap between the coils with an encapsulating material; and curing the material in the gap to bond the coils together.

17. A method as defined in claim 16 wherein the electrical resistive layers have a resistance in the range of about 1,000 to about 100,000 ohms per square unit of area.

18. A method as defined in claim 16 wherein the electrical resistive layers have a resistance of about 10,000 ohms per square unit of area.

19. A method as defined in claim 16 including mounting the first coil in a frame by engaging the first coil on all six faces and mounting the second coil in the frame within the first coil by engaging the second coil at the exposed opposite faces, and rotating and translating the coils by adjusting opposing pairs of screws carried in the frame.

* * * * *